(12) United States Patent
Aciicmez et al.

(10) Patent No.: US 8,893,225 B2
(45) Date of Patent: *Nov. 18, 2014

(54) METHOD AND APPARATUS FOR SECURE WEB WIDGET RUNTIME SYSTEM

(75) Inventors: Onur Aciicmez, Santa Clara, CA (US); Andrew C. Blaich, Menlo Park, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

This patent is subject to a terminal disclaimer.

(21) Appl. No.: 13/274,061

(22) Filed: Oct. 14, 2011

(65) Prior Publication Data
US 2013/0097654 A1    Apr. 18, 2013

(51) Int. Cl.
*G06F 21/00* (2013.01)
*G06F 21/10* (2013.01)
*G06F 21/62* (2013.01)

(52) U.S. Cl.
CPC .......... *G06F 21/00* (2013.01); *G06F 21/10* (2013.01); *G06F 21/62* (2013.01)
USPC .......................................................... 726/2

(58) Field of Classification Search
CPC ............................................. G06F 21/62
See application file for complete search history.

(56) References Cited

U.S. PATENT DOCUMENTS

| | | | |
|---|---|---|---|
| 7,062,780 B2 | 6/2006 | Leerssen et al. | |
| 7,127,605 B1 * | 10/2006 | Montgomery et al. | 713/150 |
| 7,142,848 B2 | 11/2006 | Owen et al. | |
| 7,146,158 B2 | 12/2006 | Belkin et al. | |
| 7,512,788 B2 | 3/2009 | Choi et al. | |
| 7,689,562 B2 | 3/2010 | Schaad et al. | |
| 7,743,336 B2 | 6/2010 | Louch et al. | |
| 7,792,861 B2 | 9/2010 | Kudoh et al. | |
| 7,853,987 B2 | 12/2010 | Balasubramanian et al. | |
| 7,912,971 B1 | 3/2011 | Dunn | |
| 7,945,774 B2 | 5/2011 | Ganesan | |
| 8,055,910 B2 | 11/2011 | Kocher et al. | |
| 8,056,092 B2 | 11/2011 | Allen et al. | |
| 8,060,486 B2 | 11/2011 | Chatterjee et al. | |
| 8,140,650 B2 | 3/2012 | Pulkkinen et al. | |
| 8,151,340 B2 | 4/2012 | Nakata | |

(Continued)

FOREIGN PATENT DOCUMENTS

| | | |
|---|---|---|
| CN | 101131718 | 2/2008 |
| KR | 1020090123587 | 12/2009 |

OTHER PUBLICATIONS

U.S. Advisory Action for U.S. Appl. No. 13/412,496 mailed Nov. 7, 2013.

(Continued)

*Primary Examiner* — Matthew Henning
(74) *Attorney, Agent, or Firm* — Kenneth L. Sherman, Esq.; Michael Zarrabian, Esq.; Sherman & Zarrabian LLP

(57) ABSTRACT

The security of web widgets is improved by transferring a set of access control decisions conventionally handled by the Web Runtime system (WRT) to a more secure portion of the computing system, such as a kernel in the operating system. Access control rules are extracted and provided to the more secure portion. This may be performed during widget installation or at invocation of a widget. During runtime, the more secure portion performs security checking functions for the widget instead of the WRT.

20 Claims, 8 Drawing Sheets

(56) References Cited

U.S. PATENT DOCUMENTS

| | | | |
|---|---|---|---|
| 8,171,295 B2 | 5/2012 | Munetoh et al. | |
| 8,239,938 B2 | 8/2012 | Simeral et al. | |
| 8,272,065 B2* | 9/2012 | Persson et al. | 726/27 |
| 8,452,740 B2 | 5/2013 | Seo et al. | |
| 8,495,617 B2 | 7/2013 | Kim et al. | |
| 8,504,118 B2 | 8/2013 | Kharia et al. | |
| 8,543,997 B2 | 9/2013 | Leporini et al. | |
| 8,566,910 B2 | 10/2013 | Laitinen et al. | |
| 2004/0024764 A1 | 2/2004 | Hsu et al. | |
| 2004/0210833 A1 | 10/2004 | Lerner et al. | |
| 2004/0236747 A1 | 11/2004 | Swimmer et al. | |
| 2006/0137007 A1 | 6/2006 | Paatero et al. | |
| 2007/0204333 A1 | 8/2007 | Lear et al. | |
| 2007/0256116 A1 | 11/2007 | Kerschbaum et al. | |
| 2008/0009313 A1 | 1/2008 | Ishii | |
| 2008/0046961 A1 | 2/2008 | Pouliot | |
| 2008/0082627 A1 | 4/2008 | Allen et al. | |
| 2008/0148298 A1 | 6/2008 | Chatterjee et al. | |
| 2008/0209535 A1 | 8/2008 | Athey et al. | |
| 2008/0294751 A1 | 11/2008 | Dreiling | |
| 2009/0031355 A1 | 1/2009 | Gray et al. | |
| 2009/0063691 A1 | 3/2009 | Kalofonos et al. | |
| 2009/0111448 A1 | 4/2009 | Paila | |
| 2009/0132949 A1 | 5/2009 | Bosarge | |
| 2009/0138937 A1 | 5/2009 | Erlingsson et al. | |
| 2009/0248883 A1 | 10/2009 | Suryanarayana et al. | |
| 2009/0254529 A1 | 10/2009 | Goldentouch | |
| 2009/0271778 A1 | 10/2009 | Mandyam et al. | |
| 2010/0024009 A1 | 1/2010 | Comay et al. | |
| 2010/0088739 A1 | 4/2010 | Hall et al. | |
| 2010/0100929 A1 | 4/2010 | Bae et al. | |
| 2010/0106977 A1 | 4/2010 | Persson et al. | |
| 2010/0138896 A1 | 6/2010 | Honda | |
| 2010/0223658 A1 | 9/2010 | Narasimhan | |
| 2011/0119737 A1 | 5/2011 | Wen et al. | |
| 2011/0173602 A1 | 7/2011 | Togami et al. | |
| 2011/0289560 A1* | 11/2011 | Laitinen et al. | 726/4 |
| 2012/0136936 A1 | 5/2012 | Quintuna | |
| 2012/0232973 A1 | 9/2012 | Robb et al. | |
| 2012/0233560 A1 | 9/2012 | Schneider et al. | |
| 2013/0030956 A1 | 1/2013 | Kim | |
| 2013/0036448 A1 | 2/2013 | Aciicmez et al. | |
| 2014/0032722 A1 | 1/2014 | Snow | |

OTHER PUBLICATIONS

U.S. Final Office Action for U.S. Appl. No. 13/412,496 mailed Aug. 23, 2013.

Bouganim, L. et al., "Dynamic Access-Control Policies on XML Encrypted Data", ACM Transactions on Information and System Security (TISSEC), Jan. 2008, pp. 1-37, vol. 10, No. 4, ACM, USA.

Goncalves, V. et al., ""How about an App Store?" Enablers and Constraints in Platform Strategies for Mobile Network Operators", Proceedings of the 2010 Ninth International Conference on Mobile Business / 2010 Ninth Global Mobility Roundtable (ICMB-GMR '10), Jun. 2010, pp. 66-73, IEEE Computer Society, USA.

International Search Report dated Jan. 29, 2013 for International Application No. PCT/KR2012/006097 from Korean Intellectual Property Office, 3 pages, Seo-gu, Daejeon, Republic of Korea.

U.S. Non-Final Office Action for U.S. Appl. No. 13/412,496 mailed Mar. 14, 2013.

U.S. Final Office Action for U.S. Appl. No. 13/412,496 mailed Mar. 5, 2014.

U.S. Non-Final Office Action for U.S. Appl. No. 13/412,496 mailed Dec. 4, 2013.

Widgets, "Widgets 1.0 Requirements", W3C Working Draft, Feb. 9, 2007, W3C, pp. 1-22, United States.

Mukhija, A., "CASA—A framework for Dynamically Adaptive Applications", Doctoral Thesis, Dec. 2007, pp. 1-217, University of Zurich, Switzerland.

Hassinen, M. et al., "Trustworthy Widget Sharing", HIIT Technical Reports Mar. 2010, pp. 1-128, Helsinki Institute for Information Technology (HIIT), Finland.

* cited by examiner

METHOD AND APPARATUS FOR SECURE WEB WIDGET RUNTIME SYSTEM

FIELD OF THE INVENTION

The present invention is generally directed to improving the security of web widgets. More particularly, the present invention is directed as improving security in a web widget runtime system

BACKGROUND OF THE INVENTION

A widget (also commonly referred to as a web widget) is an interactive single purpose application for displaying and/or updating local data or data on the Web, packaged in a way to allow a single download and installation on a user's machine or mobile device. Widgets are client-side applications that may be authored using web standards and packaged for distribution. They may be downloaded and installed on client machines. A widget may run as a stand-alone application (meaning it can run outside of a Web browser). Widgets are downloadable applications commonly written using HTML, JavaScript, and CSS and utilize web technologies and standards.

The runtime environment in which a widget is run is referred to as a widget user agent or the Web Runtime System (WRT). The WRT is responsible for installation/de-installation of widgets, and to provide functionality for invocation and configuration of the widgets. The WRT is also responsible for the execution of widgets. For example, Web widgets are typically written in JavaScript, which is an independent language. The WRT contains a software module, known as a JavaScript engine, to interpret the widget's JavaScript code and perform the execution.

FIG. 1 illustrates an example of a simplified high level architecture diagram of a WRT based on the Limo™ platform (i.e., Linux™ based mobile phone platforms). In this example, at the User Interface (UI) layer, the widgets may perform functions such as providing weather information, a clock, or a photo viewer. There is a Web Runtime UI. At the engine layer, there is a widget engine and a widget manager. At the core layer, there is a Webkit. The Webkit is a library used in Web engines. The WRT is the collection of all components, over and above the Web Engine at the core layer, needed to support installed widgets.

A widget package is a package, conforming to specific standards (e.g. See "Widgets: Packaging and Configuration specification", W3C Proposed Recommendations, 11 Aug. 2011, published by W3C, the World Wide Web Consortium), containing various files (including configuration documents, icons, digital signatures, etc.) that constitute the implementation of a widget. A widget package contains metadata, which will be referred to in this patent application as the manifest file, for the associated widget. A manifest file specifies a multitude of things of which include the access restrictions for a widget. The access restrictions are used by the WRT to control accesses by a widget to device capabilities, network resources, file system, etc.

There are several different standards bodies that are setting slightly different specifications and standardizations for widgets and JavaScript APIs for widgets. These bodies setting specification for widgets include: W3C, WAC, JIL, BONDI, and Opera among others. As a result, there are different types of widgets and widget runtime systems. Although, the details of the specifications (e.g., how to specify access rights and the granularity of permissions) differ, the general security models and access control enforcement principles of these widget systems are very similar.

The access control enforcements in current WRT implementations are handled by the user-space code of the WRT in the same process that runs the widget itself. For example, these controls and enforcements are handled in Web Engine code as shown in FIG. 2 which shows an overall high level architecture of a BONDI widget implementation having access control features at the Web Engine level.

Referring to FIG. 3, the inventors of the present patent application have recognized that a security vulnerability in conventional WRT arises because the access control enforcement in current WRT implementations is handled by the user-space code of WRT, which is in the same process that runs the widget itself. For example, these controls and enforcements are handled in the Web Engine (e.g. WebKit) code. As illustrated in FIG. 3, a benign process with a legitimate access flow will go through security checks. However, a compromised process has a corrupted access flow that can result in bypassing the mentioned security checks.

Security controls in conventional WRTs are inherently vulnerable and can be bypassed via threats such as address space corruption and code injection. For example, a web engine may contain a bug that allows remote attackers or malicious widgets to inject and run arbitrary code or change the legitimate control flow in that web engine. As a result, an attacker/widget can bypass the security checks and access the restricted resources as illustrated in the below figure.

As an illustrative example, Safari™, the popular web browser has several vulnerability types that can result in bypassing security checks. Safari™ is based on the same web engine, called WebKit, which is used in many mobile platforms including iPhone™ and Android™ platforms. These vulnerabilities include an execute code vulnerability, an overflow vulnerability, and a memory corruption vulnerability. Safari™ is based on the same WebKit web engine used in many mobile platforms. Thus, there are significant security concerns associated with conventional WRT security controls.

SUMMARY OF THE INVENTION

An apparatus, system, method, and computer program product is disclosed for addressing a security vulnerability for web widgets. In one embodiment, the Web Runtime (WRT) system is modified to generate access control rules for the widget and pass them on to a more secure portion of the system, such as an operating system or kernel. At runtime the WRT delegates corresponding security checks to the more secure portion of the system. The access control rules are extracted and provided to the more secure portion during widget installation or at invocation of the widget.

DETAILED DESCRIPTION

The present invention is generally directed at improving the security of widget systems and providing protection to the device and other applications from a compromised or malicious widget and/or the process that runs the widget. In one embodiment, a set of access control rules are delegated from a Web Runtime (WRT) system to a more secure portion of the computer system outside of the user space code of the WRT, thus improving widget security.

Figure 1:
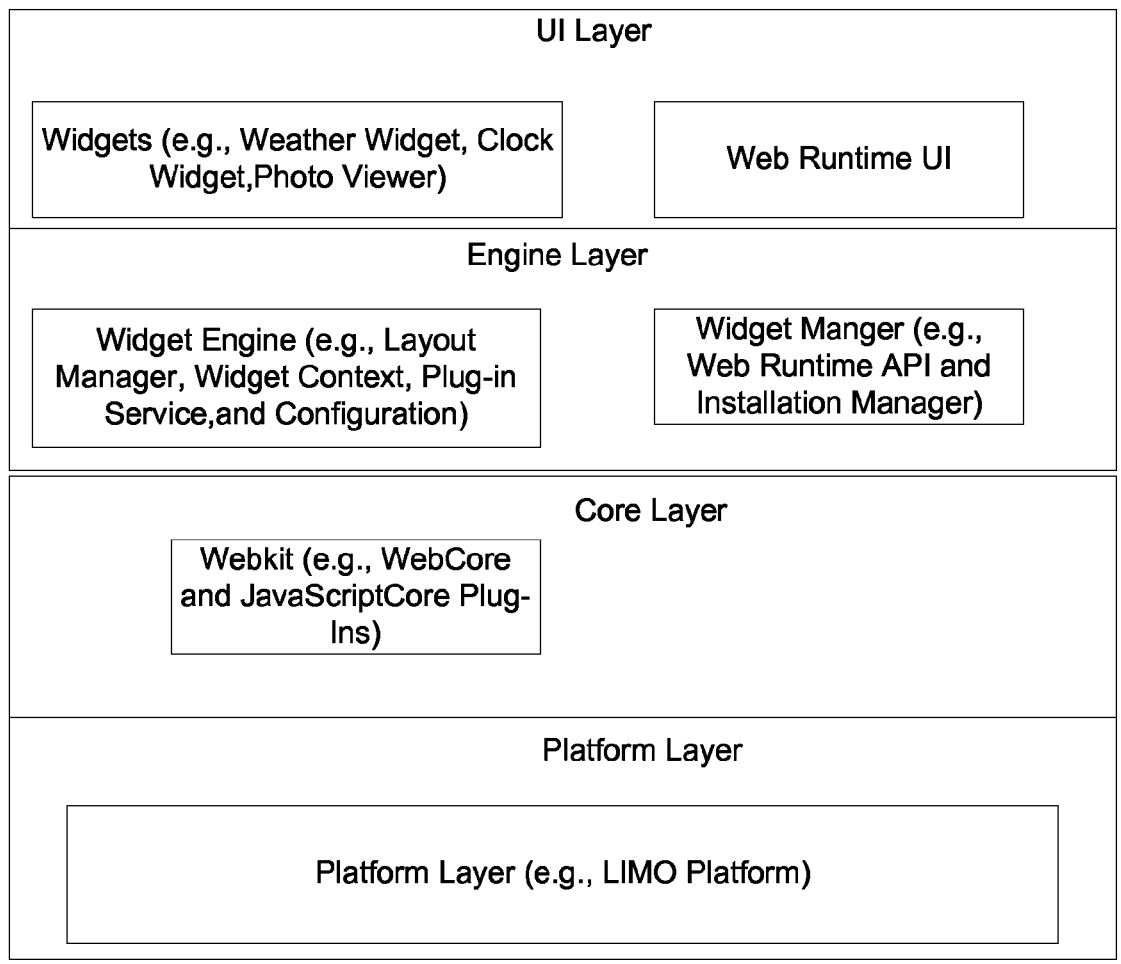
FIG. 1 is a high level architecture diagram of a prior art Web Runtime system.
Figure 2:
FIG. 2 is a high level a high level architecture diagram illustrating portions of a prior art Web Runtime Architecture.
Figure 3:
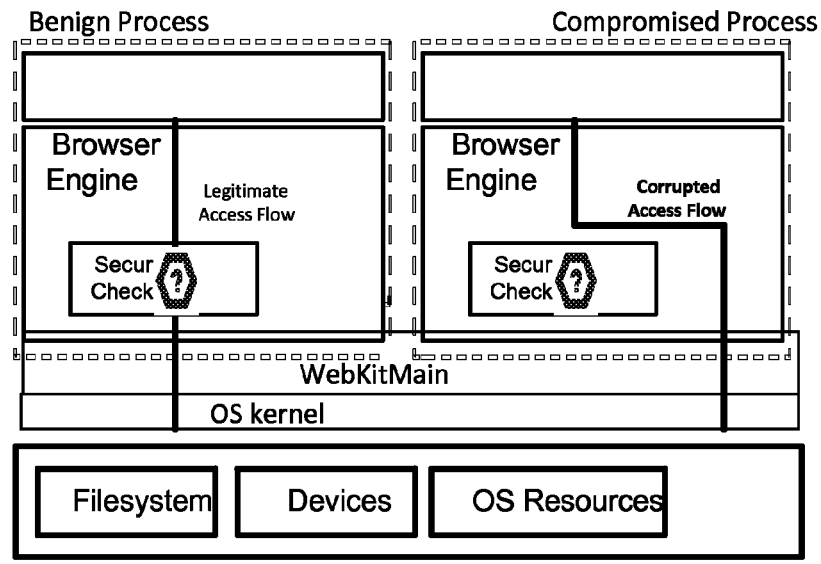
FIG. 3 illustrates widget security vulnerabilities in prior art systems.
Figure 4:
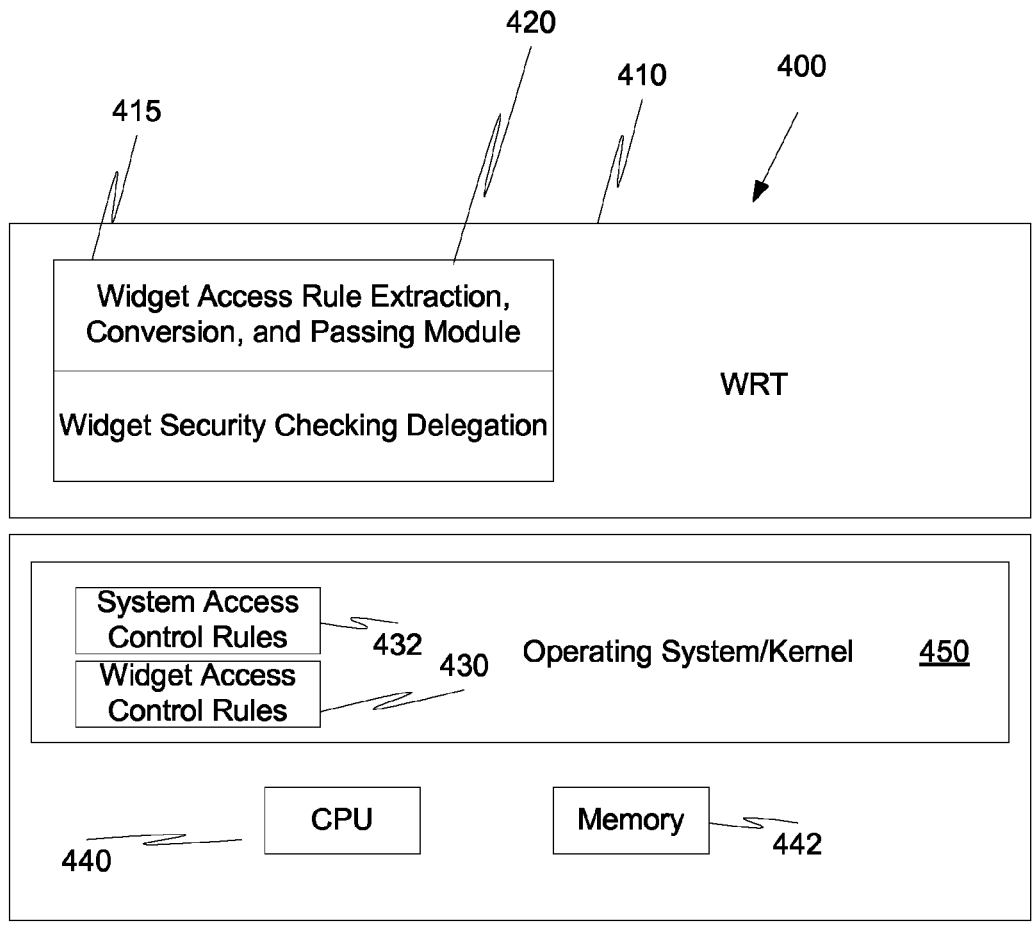
FIG. 4 is a high level diagram of a system for improved widget security in accordance with one embodiment of the present invention.

FIG. 4 illustrates an exemplary computer system 400 having a hardware platform with a CPU 440 and a memory 442. A conventional widget (not shown in FIG. 4) may be installed into the computer system 400, where the widget is a client-side application downloaded and installed on the computer system. An operating system/kernel 450 is provided and supports higher layer software levels in a user space. The computer system includes a modified WRT system 410 to support widgets. The WRT system 410 is in the user space, i.e., is outside of the Operating System/Kernel. The WRT system 410 includes a widget access rule extraction, conversion, and passing module 415. In an embodiment of the present invention, the WRT system 410 extracts and provides widget access control rules 430 to a more secure portion of the computing system, such as the kernel. Moreover, the access rules are converted into a form that the more secure portion can utilize to perform security checks for the widget. Thus, in this example the OS/kernel has conventional system access control rules 432 and also widget access control rules 430 in a form that the OS/kernel can process to perform security checking for the widget.

The kernel is a protected portion of the operating system and thus is more secure than the user code of the WRT 410 against security threats. In this example the result is that the kernel contains conventional system access control rules 432 and additional widget access control rules 430. The WRT includes a widget security checking delegation module 420. This may be implemented as one or more modification of the WRT so at runtime the WRT delegates at least a subset of security checking for the widget to the more secure portion, e.g., the OS/Kernel.

Figure 5:
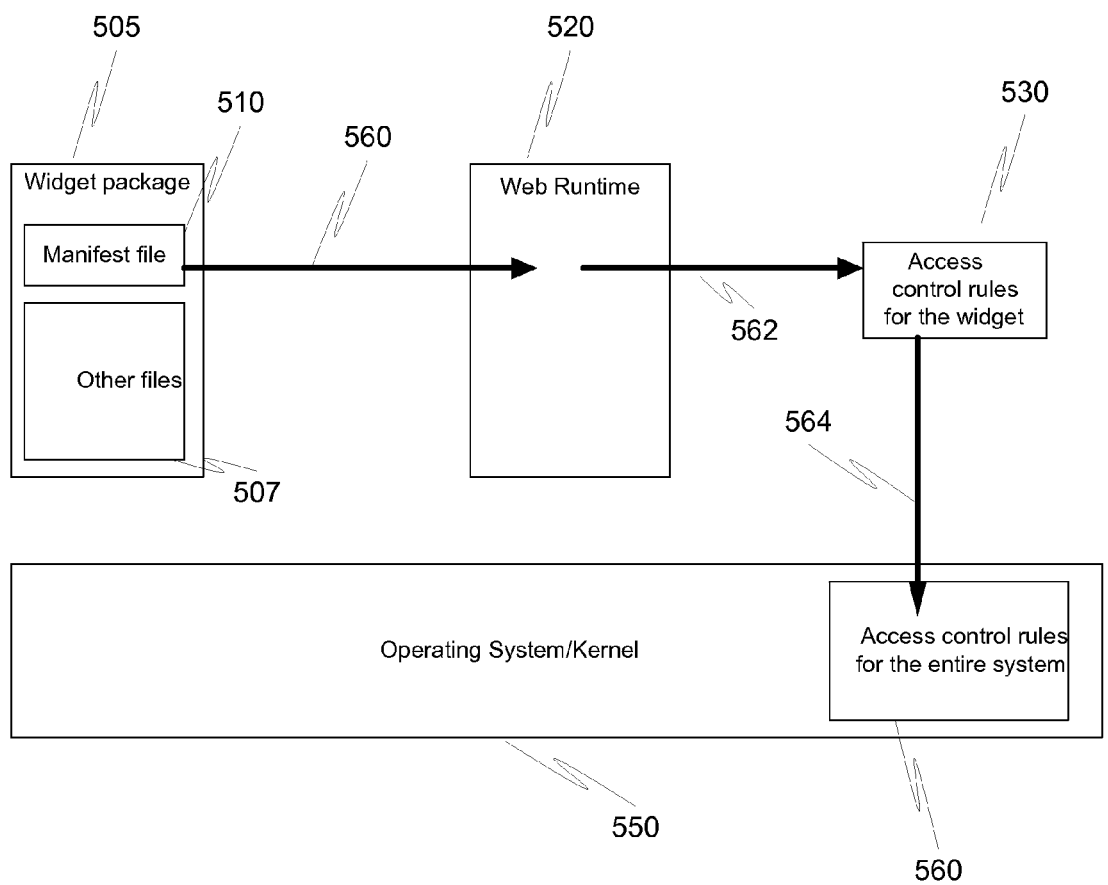
FIG. 5 illustrates a modified Web Runtime system providing widget access rules to a more secure portion of the system, such as an operating system kernel, in accordance with one embodiment of the present invention.

FIG. 5 illustrates an exemplary set of steps for generating security rules during installation of a widget. There are different types of widgets associated with different standards bodies (e.g. W3C widgets, WAC widgets, etc.) and also different widget runtime systems. However, the general security models and access control enforcement principles are similar such that it will be understood that the present invention is applicable to different types of widgets and runtime systems.

A widget is distributed in a widget package 505, which contains a manifest file 510 along with other files 507 like a widget's HTML, CSS files, Javascript™ code, etc. A manifest file contains metadata such as widget's name, author information, configuration information, etc. A manifest file also contains metadata related to access rights required for its widget to operate. For example, if a widget needs to access a network resource, or a device resource like a camera, the manifest file of this widget must specify these resources. As an example of a manifest, consider the following simplified manifest file:

```
<widget id= "http://quirksmoke.org/widget" dockable= "true">
    <widgetname>Test widget</widgetname>
    <icon>pix/myIcon.gif</icon>
    <width>200</width>
    <height>200</height>
    <security>
        <access>
            <host>quirksmode.org</host>
        </access>
    </security>
</widget>
```

In the example of the simplified manifest file, the widget manifest file 510 includes a name, identification information, and specifies access rights to a network host. In this example, the widget requires access to a network host "quirksmode.org" as a resource. Then in this example, the access to the specified network host resource is specified using the <security> and <access> tags. Similarly, manifest files may contain access requests to other resources like a camera, personal information such as address book or contact list entries, location information, etc.

During installation of a widget, the WRT module 520 has a management process that processes 560 the widget's package including its manifest file 510 and then identifies and extracts its granted access rights associated with valid access requests. (The WRT module 520 includes at least those components of the total WRT associated with installation of a widget, although it will be understood that the WRT as a whole includes components for both installation and execution of a widget.) Then, the WRT module 520 compiles the list of granted access right for the widget and generates access control rules 562 for this widget based on the identified rights. These access control rules 530 for the widget are passed 564 to a more secure portion of the computing system directly or indirectly, such as to the OS/kernel 550 and/or appropriate OS/framework daemons/services. In this example, the widget access control rules 530 are passed to a region storing access control rules for the entire system 560.

When the widget is invoked, the WRT module 520 creates or reserves a process for its execution. As a result, the widget executes in a process separate and isolated from other active widgets. During execution of the widget, security checks and enforcements are delegated to the more secure portion 550 of the OS kernel and other related processes. The WRT module 520 does not have to perform the security controls for the types of accesses that it delegated by generating and passing rules to the more secure portion 550 of the kernel and related processes.

In one implementation Mandatory Access Control (MAC) is used as part of the security decision and enforcement scheme. In general, the rules passed by the WRT module 520 to the kernel can be MAC rules and the kernel can enforce these rules through its MAC mechanisms. This provides greater security assurances compared to conventional widget security approaches.

Many minor variations of the steps illustrated in FIG. 5 may be included depending on implementation details regarding the widget, the OS/kernel, and the security mechanisms used on the platform. As can be seen in FIG. 5, the WRT module 520 processes the widget package 505 during installation and identifies the access requests/needs of the widget. The WRT module 520 compiles the access rights granted to this widget. This process may involve other steps such as checking user preferences, system policies, or prompting the user to get confirmation of the permission granting. Some details of the granted permissions, the granularity of the permissions, etc. differ between different widget systems and are thus implementation-specific.

After the WRT module 520 compiles the list of (or a partial list of) granted permissions for a widget, it generates security rules according to this list. The WRT passes the generated security rules to the kernel. This can happen in various means depending on the specifics of the OS/kernel and the details of the security mechanisms utilized on the platform. For example, WRT can update a general policy file on the system or issue a system call to dynamically inform the kernel of these security rules. In one embodiment, the WRT module 520 generates MAC rules (such as Security-Enhanced Linux™ (SELinux) or SMACK rules for Linux™ systems, or iptables/Netfilter rules to control network accesses on Linux™) that can be enforced by the kernel while the widget is running.

Referring back to FIG. 5, some differences between the present invention and conventional WRT implementations are now explained. Conventional WRT implementations process widget packages, extract access request from the manifest file, and compile the list of granted access rights for the widget. But, then they store the permission lists in e.g. a database file (as done in SLP WRT) or a file for the WRT to retrieve them later for the WRT to enforce access rules. They do not generate any MAC rules or pass any rules to the kernel. At the invocation of a widget, a conventional WRT would read its permission list from the database and handle the security checks and enforcement by itself during the widget execution. In contrast, in the embodiment of FIG. 5 the WRT is modified to generate access control rules in a form that may be passed on to the kernel for the kernel to perform at least some of the security checking conventional performed by the WRT. This requires significant modification of conventional WRT system implementations. In the example of having the kernel implement MAC rule to enforce the widget security checks, this requires converting the access control rules into MAC rules. For example, in one implementation the modifications to the WRT includes:

removing (or disabling) the WRT code that stores the permission lists for later retrieval by the WRT; and implementing an algorithm to generate MAC rules from the permission list specific to the requirements of the OS and MAC technology used, which is added to the WRT codebase the algorithm along with code to pass the generated MAC rules to the OS/kernel.

Figure 6:
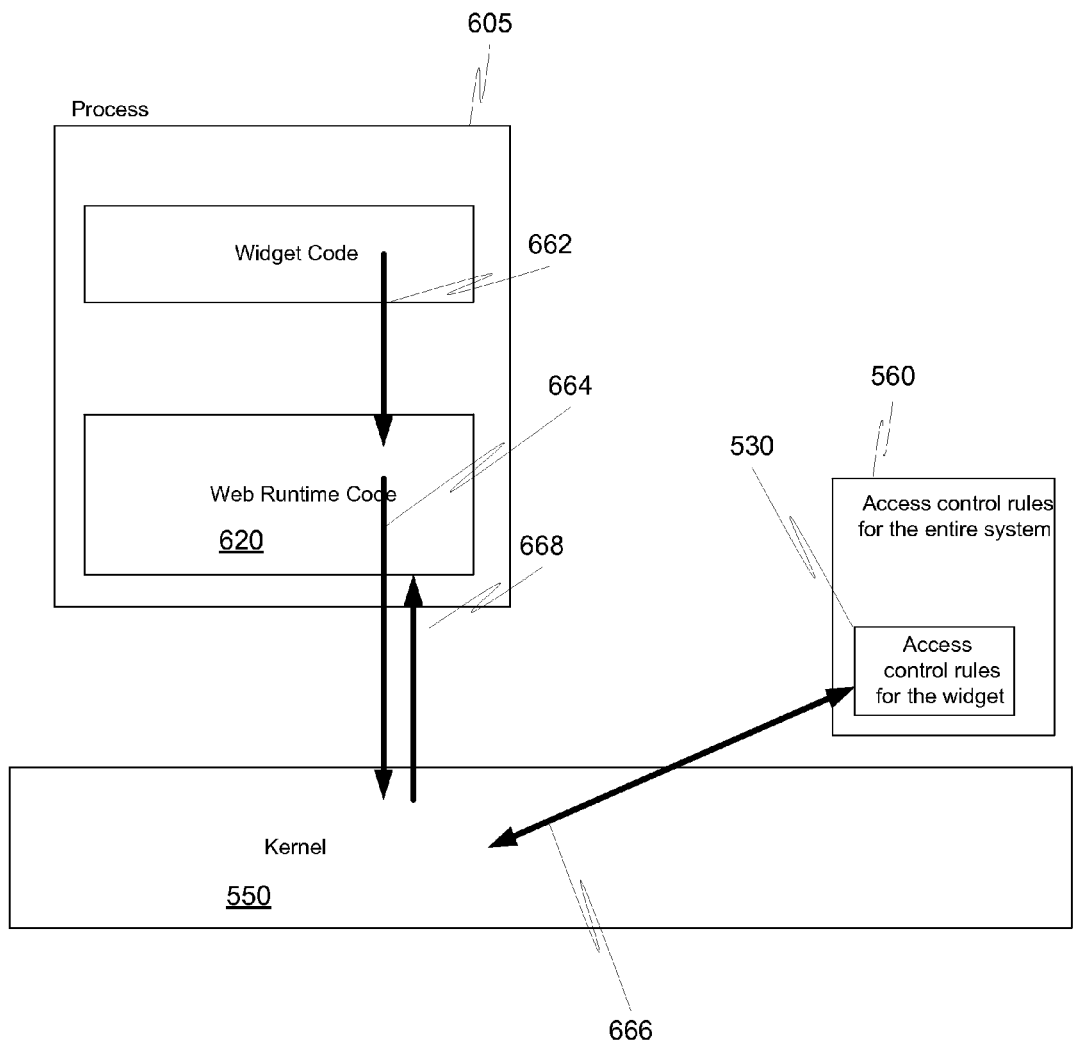
FIG. 6 illustrates delegation of security checking from the Web Runtime to the kernel in accordance with one embodiment of the present invention.

FIG. 6 illustrates an example of general steps for enforcing security rules at runtime for rules that were passed on the OS/kernel. When a widget is invoked, the WRT module 620 executes it in a separate process 605 isolated from other applications and widgets. It would be understood by one of ordinary skill in the art that while there is one WRT, there are different components of the WRT. The WRT module 620 of FIG. 6 includes at least the components of the WRT associated with widget execution. The WRT system management process also configures the security attributes (e.g. SELinux or SMACK labels) of this process 605 accordingly so that the kernel 550 can differentiate the widget that is being run in the process. As illustrated by arrow 662, the widget then tries to access a controlled resource—i.e., a resource is controlled by the kernel via the access control rules 530 previously generated by the WRT and passed to the system. The WRT module 620 then issues the related system calls to the kernel without performing the security checks, as illustrated by arrow 664. That is, the WRT delegates the security checking to the OS/kernel 550. The kernel then inspects the system call and checks the widget access control rules 530, as illustrated by arrow 666. The kernel then makes a decision whether to deny or proceed with the operation. The kernel then returns a result to the WRT module 620, as illustrated by arrow 668. If access is denied, the kernel returns with an error code. If access is allowed, the kernel performs the operation and returns the result. Thus, when the kernel receives a call from the process that executes this widget, it checks the access rules for the widget and inspects the details of the call (e.g., the parameters, the objects that will be affected by the call, etc.) and then it either allows or denies the call.

At invocation of a widget, conventional WRT implementations reads their respective permission lists e.g. from a database and handle the security checks and enforcement by themselves during the widget execution. In contrast in the present invention, these security checks and enforcements are removed from the WRT and the responsibility is delegated to the kernel. The WRT does not perform any checks related to the MAC rules already passed to the kernel. Instead, it allows related requests to always go through without blocking them. The actual security controls are handled by the kernel. This requires modifying an existing WRT to remove these conventional security checks. Moreover, depending on the OS and MAC technology, extra code may need to be added to the WRT to configure the security contexts (e.g. MAC subject labels) of the widget processes just before executing the widgets.

As previously described, the kernel can control the widget accesses through MAC mechanisms. Some exemplary mechanisms will now be discussed, although it will be understood that other mechanisms may also be used. In one embodiment, assume that a widget does not have network access permissions, i.e., its manifest does not specify any requirements to access a network or specifically requests that no network access shall be given. The WRT is programmed to understand when processing this widget's manifest that this widget should be prohibited to access the network. In this example, the WRT assigns a security context (e.g. a SMACK or SELinux label) to this widget (i.e., to the process that will execute the widget) and generates MAC rules to prohibit any network access requests from this widget (or, depending on the MAC system in use, the WRT will not generate any rules to allow network access). The WRT passes this information (the security context+MAC security rules) to the kernel. If the widget tries to access a network resource at runtime, the kernel will receive a system call from this widget's process that requests to access the network. The kernel will check the process's security context and realize that the access should be denied. It will not perform the system call and return an error message to the calling process.

Now assume that a widget does not have permissions to access location/information on a platform (e.g., Global Positioning System (GPS) location information). Also, assume that there is a system daemon on this platform that handles the distribution of GPS information. More specifically, only this daemon has access to GPS hardware and all the other processes/applications need to send requests to this daemon to get GPS data. The WRT understands when processing this widget's manifest that this widget should be prohibited to access GPS information. The WRT assigns a security context (e.g. a SMACK or SELinux label) to this widget (i.e., to the process that will execute the widget) and generates MAC rules to prohibit (or, depending on the MAC system in use, the WRT does not generate any rules to allow) this widget to communicate with the GPS daemon (e.g., prohibits an Inter-Process Communication (IPC) between the widget process and the daemon). The WRT passes the information (the security context+MAC security rules) to the kernel. If this widget tries to communicate with the GPS daemon to get location info at runtime, the kernel will receive a system call (e.g. an IPC call) from this widget's process to communicate with the daemon. The kernel will check the security contexts of the widget process and GPS daemon and realize that the access should be denied. It will not perform the system call and return to the process an error message.

On the other hand, in this example if the widget is granted permission to access GPS information, the WRT generates rules to allow the IPC (or does not generate any rule to prohibit it) between the widget process and the GPS daemon. When this widget tries to access the GPS data at runtime, the kernel will receive a system call (e.g. an IPC call) from this widget's process to communicate with the daemon. The kernel will check the security contexts of the widget process and the GPS daemon and realize that the access should be granted. It will proceed with the system call.

In one preferred embodiment, a kernel level Mandatory Access Control is used for security decision and enforcement. In computer security, MAC refers to a type of access control by which the operating system constrains the ability of a subject or initiator (e.g. a process that executes a widget) to access or generally perform some sort of operation on an object or target (e.g. a particular file, network resource, or a hardware component). In practice, a subject is usually a process or thread; objects are constructs such as files, directories, TCP/UDP ports, shared memory segments, etc. Subjects and objects each have a set of security attributes. Whenever a subject attempts to access an object, an authorization rule enforced by the operating system kernel examines these security attributes and decides whether the access can take place. Any operation by any subject on any object will be tested against the set of authorization rules (e.g. a policy) to determine if the operation is allowed.

There are various MAC technologies available in different operating systems. Linux™ has four different main MAC mechanisms—SELinux, Smack, Tomoyo, and AppArmor—implemented in the mainline kernel. Although they are all based on the same or similar principles, their architectures, capabilities, and usage show significant differences.

As previously mentioned, there are many potential variations in the WRT and the OS implementation at a fine level of granularity. Thus, implementation details will determine how much of the security checking can be offloaded to the kernel. Depending on the widget system and OS combination, some widget activities may not translate/map well to the kernel system calls. In such cases, the kernel may not be able to provide fine grained security controls as needed by the widget system. To address this situation, the WRT may be programmed to identify which widget activities can be controlled by the kernel via inspecting system calls and then delegate only that subset of controls to the kernel. If the kernel or OS cannot provide sufficient security controls for some widget activities, then WRT needs to handle those controls that cannot be handled by the OS/kernel. Thus, in principle there are situation where the WRT will provide security checks/controls at a fine level of granularity while the kernel provides security checking at a coarser level of granularity based on what checking can be delegated to the kernel. In such scenarios, several modification can be made to the WRT. This includes having the WRT pass to the OS/kernel those access control rules that correspond to the activities that can be satisfactorily controlled by the OS/kernel. During runtime of the widget, this corresponds to the WRT passing to the kernel/OS, without performing any security checks, only those requests that correspond to the security checking related activities for the widget that can be satisfactorily controlled by OS/kernel. The activities or requests that cannot be satisfactorily controlled by OS/kernel will be handled by WRT itself.

Figure 7:
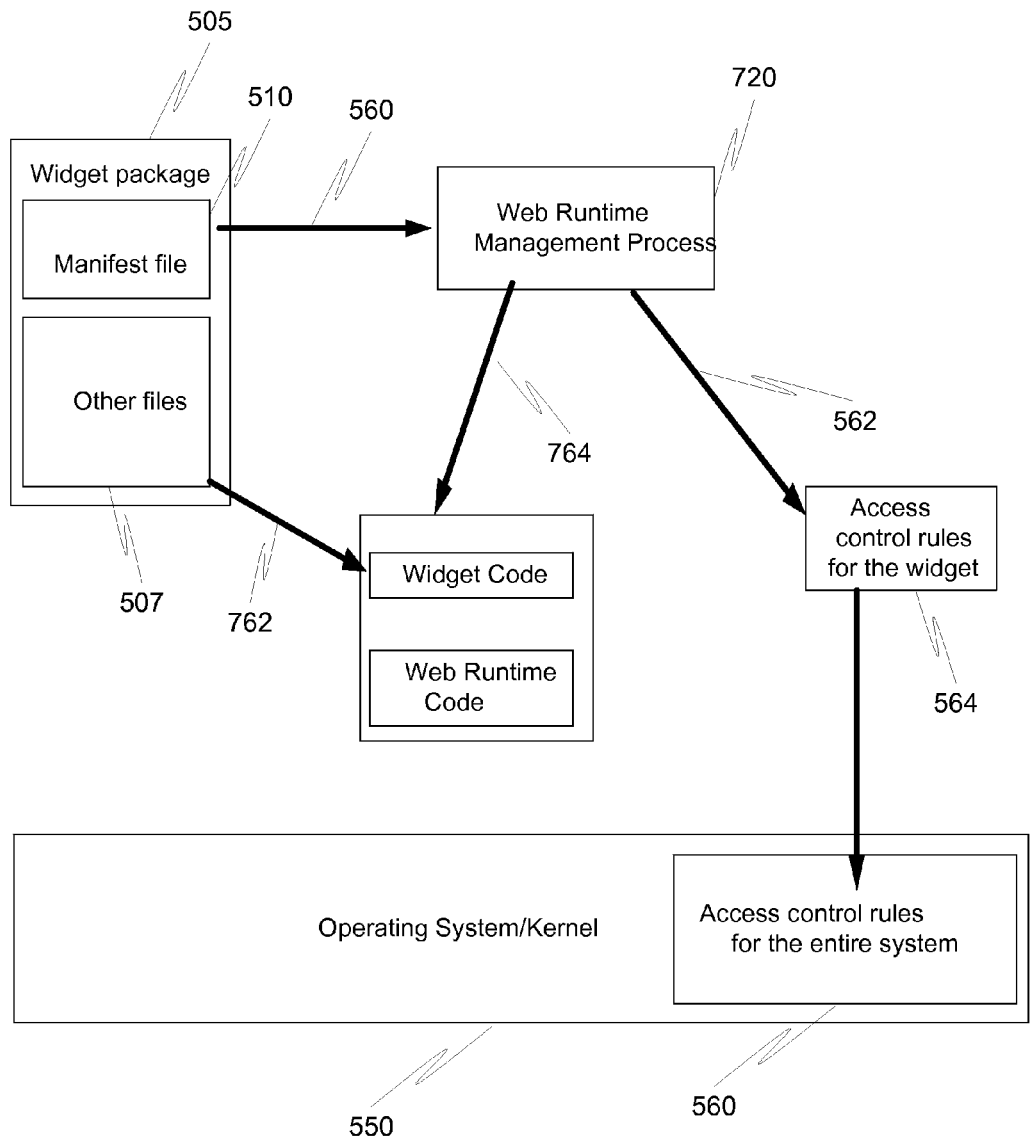
FIG. 7 illustrates a modified Web Runtime system providing widget access rules to a more secure portion of the system, such as an operating system kernel, in accordance with one embodiment of the present invention.

Many variations and various embodiments of the present invention are contemplated. Referring to FIG. 7, in one embodiment the generation of security rules occurs at invocation instead of during installation. For example, the WRT system management process 720 can process the widget package, extract access requests from the manifest file as indicated by arrow 562. The WRT can then generate the rules and pass them to the OS 550 just before starting to execute a widget when the user wants to invoke it. The primary difference over the example of FIG. 5 is illustrated by arrow 764, which illustrates that the management process created a new process to run the widget and also, as illustrated by arrow 762, the widget code and data is retrieved from the new process and widget execution starts.

In another embodiment, the WRT can delegate the rule generation to another entity (e.g. an OS service or process). In this embodiment the WRT 520 can pass the manifest file and other related information to this entity, which handles the rule generation and updating the policies (i.e., passing the rules to the kernel).

Figure 8:
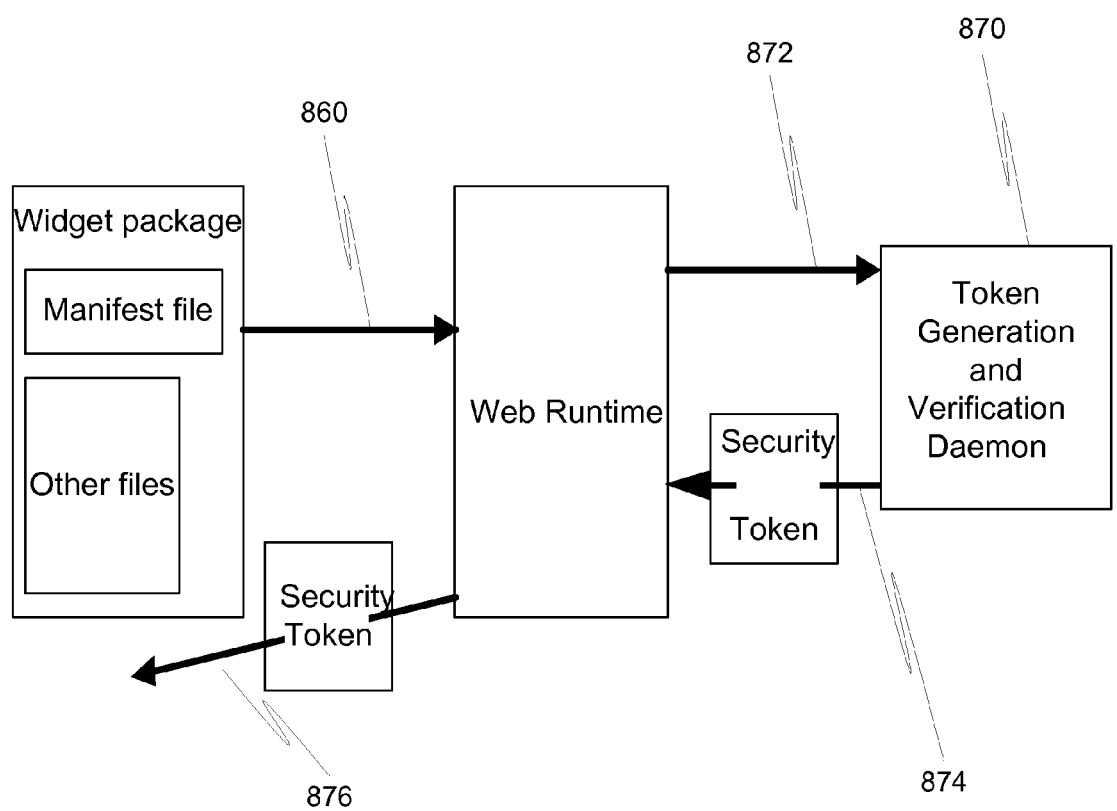
FIG. 8 illustrates using security tokens to enforce widget security in accordance with an embodiment of the present invention.
Figure 9:
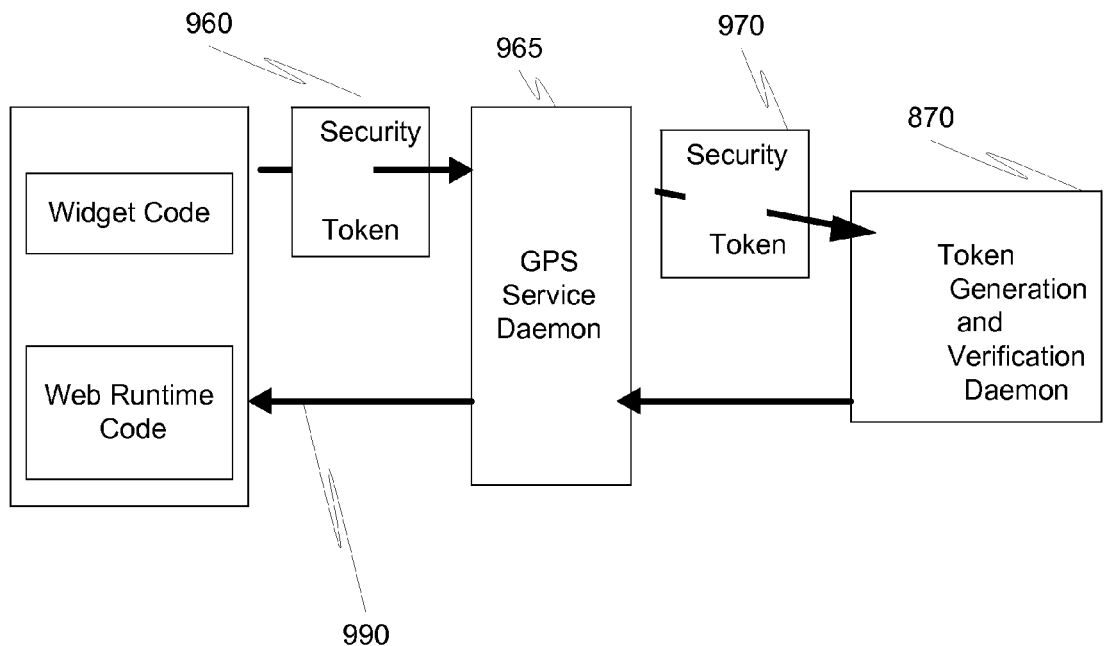
FIG. 9 illustrates an example of using security tokens to perform a security check for a location service request of a widget in accordance with one embodiment of the present invention.

As previously described, in a preferred embodiment, the security enforcement is handled via MAC mechanisms by the kernel to eliminate the security weakness of the WRT performing security checks. However, other arrangements are possible in which a more secure portion of the computer system handles the security checking of the widget, such as by using OS daemons and/or security tokens. Alternative embodiments can realize this in various different ways as illustrated in FIGS. 8 and 9. Security checks and enforcements can rely on security tokens. Each widget can have a security token that shows its access rights.

As illustrated in FIG. 8, during installation or at invocation, the WRT processes the widget package and extracts the access request form the manifest file, as indicated by arrow 860. The WRT then compiles the list of granted access rights for the widget and also requests a security token for the granted rights, as indicated by arrow 872, form a token generation and verification daemon 870. The daemon generates an appropriate security token and passes it back to the WRT as indicated by arrow 874. The WRT then stores the security token for later use as indicated by arrow 876.

Such a token needs to be generated by a trusted party (e.g. WRT or a system daemon), protected from tampering by untrusted parties (e.g. widget), authentic and verifiable, and allows other entities (e.g. system services) to check the access rights of the widget.

FIG. 9 is an illustrative use example where a security token has been previously stored by a WRT. Assume that a platform uses token-based security framework and also has various system or OS framework daemons for accessing e.g. GPS, sensors, etc. A widget running on this platform wants to access GPS data. The WRT request access to GPS data and attaches its security token to the request to a GPS service daemon 965, as illustrated by arrow 960. The GPS daemon 965 receives the request and checks the security token. This may includes sending the token (arrow 970) to the token generation and verification daemon 870 to check if the widget requires rights to access the requested data. The token generation and verification daemon 870 checks the received token to determine if the widget can be granted access and returns an allow/deny decision back to the GPS daemon 965. The GPS service daemon 965 returns a message as indicated by arrow 990. If this widget has permission to access GPS data (as indicated in its security token), the GPS service daemon 965 fulfills the request and returns the requested result. Otherwise, the GPS service daemon refuses to perform the request and sends back an error message.

The present invention provides improved security for widget runtime execution. In particular, at least a subset of the security checking traditionally performed by the WRT in the user space is moved to the more secure portions of the computer, such as the Kernel system in the OS. As a result, widget security vulnerabilities are addressed. The modified WRT may be part of the software loaded on a new consumer electronic device or computer system. However, more generally the WRT and its associated methods for improving widget runtime security may also be provided on a non-transitory computer readable medium.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

Examples of these specific embodiments have been illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the previous description, specific details were set forth in order to provide a thorough understanding of the present invention. The present invention may be practiced without some or all of these specific details. In addition, well known features may not have been described in detail to avoid unnecessarily obscuring the invention.

What is claimed is:

1. A method of providing security enforcement of widgets in a computer system having a processor and a memory, comprising:
    extracting access control information from a widget;
    based on the access control information, generating access control rules;
    providing the access control rules to a trusted portion of the computer system outside of user space code of a Web Runtime (WRT) system; and
    delegating security checking of the widget, using the access control rules, from the WRT system to the trusted portion;
    wherein, during runtime of the widget, at least a portion of the security checking of the widget is performed by the trusted portion.

2. The method of claim 1, wherein the trusted portion is an operating system or kernel.

3. The method of claim 2, wherein the access control rules are implemented as mandatory access control rules enforced by the kernel.

4. The method of claim 1, wherein the trusted portion includes a token-based security framework in which a system service performs token-based security checking.

5. The method of claim 1, wherein the WRT system, in response to installation of the widget, performs said extracting of access control information, said generating access control rules, and said providing the access control rules.

6. The method of claim 1, wherein the WRT system, in response to invocation of the widget, performs said extracting of access control information, said generating access control rules, and said providing the access control rules.

7. The method of claim 1, further comprising:
    determining a subset of the access control rules performable by the trusted portion and a remaining portion of the control rules performable only by the WRT system, wherein the subset of access control rules performable by the trusted portion is provided to the trusted portion, and wherein security checking for the subset of access control rules performable by the trusted portion is delegated to the trusted portion.

8. A computer system having improved widget security, comprising:
    at least one processor;
    a memory;
    an operating system; and
    a Web Runtime system supporting installation and invocation of widgets;
    wherein the WRT system includes user space code for executing the widgets;
    wherein the WRT system is outside of the operating system;
    wherein the WRT system is configured to eliminate a security risk in the user space code; and
    wherein the WRT system is further configured to receive a widget manifest from each installed widget, determine, based on the widget manifest, a set of access control rules delegable from the WRT system to a secure portion of the computer system associated with the operating system, and pass the set of delegable access control rules to the secure portion to perform security checking when the widget is invoked.

9. The computer system of claim 8, wherein the secure portion is a kernel.

10. The computer system of claim 9, wherein the set of delegable access control rules are implemented as mandatory access control rules enforced by the kernel.

11. The computer system of claim 8, wherein the secure portion includes a token-based security framework in which a system service performs security checking.

12. The computer system of claim 8, wherein the WRT system, in response to installation of a widget, determines a set of delegable access control rules based on a widget manifest from the installed widget.

13. The computer system of claim 8, wherein the WRT system, in response to invocation of a widget, determines a set of delegable access control rules based on a widget manifest from the invoked widget.

14. A computer system having improved widget security, comprising:
    at least one processor;
    a memory;
    an operating system having a kernel;
    wherein the kernel is configured to:

receive a set of access control rules for a widget from an entity in a user space code, wherein the set of access control is delegated from the entity to the kernel; and during runtime of the widget, perform security checking for the widget based on the set of access control rules.

15. The computer system of claim 14, wherein the kernel receives the set of access control rules directly or indirectly from a Web Runtime (WRT) system.

16. The computer system of claim 14, wherein the set of access control rules are implemented as mandatory access control rules enforced by the kernel.

17. A computer program product comprising computer readable instructions stored on a non-transitory computer readable medium which when executed on a processor of a computer system implement a method including:

extracting access control information from a widget;

based on the access control information, generating access control rules;

providing the access control rules to a trusted portion of the computer system outside of user space code of a Web Runtime (WRT) system; and delegating security checking of the widget, using the access control rules, from the WRT system to the trusted portion;

wherein, during runtime of the widget, at least a portion of the security checking of the widget is performed by the trusted portion.

18. The computer program product of claim 17, wherein the trusted portion is an operating system or kernel.

19. The computer program product of claim 18, wherein the access control rules are implemented as mandatory access control rules enforced by the kernel.

20. The computer program product of claim 17, wherein the trusted portion includes a token-based security framework in which a system service performs security checking.

* * * * *